(12) United States Patent
Tsuji

(10) Patent No.: US 11,001,468 B2
(45) Date of Patent: May 11, 2021

(54) MOUNT APPARATUS TO BE MOUNTED ON MAIN BODY OF IMAGE FORMING APPARATUS, AND IMAGE FORMING APPARATUS INCLUDING MOUNT APPARATUS

(71) Applicant: CANON KABUSHIKI KAISHA, Tokyo (JP)

(72) Inventor: Hiroharu Tsuji, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/409,194

(22) Filed: May 10, 2019

(65) Prior Publication Data
US 2019/0263619 A1 Aug. 29, 2019

Related U.S. Application Data

(63) Continuation of application No. 15/838,959, filed on Dec. 12, 2017, now Pat. No. 10,329,113.

(30) Foreign Application Priority Data

Dec. 28, 2016 (JP) .............................. JP2016-256754

(51) Int. Cl.
*B65H 31/22* (2006.01)
*B65H 39/06* (2006.01)
(Continued)

(52) U.S. Cl.
CPC ............ *B65H 31/22* (2013.01); *B41J 13/106* (2013.01); *B41J 29/08* (2013.01); *B41J 29/13* (2013.01);
(Continued)

(58) Field of Classification Search
CPC ........ B65H 31/22; B65H 31/24; B65H 39/11; B65H 2402/63; B65H 2402/64;
(Continued)

(56) References Cited

U.S. PATENT DOCUMENTS 5,810,353 A * 9/1998 Baskette ................ B65H 29/60
271/305
6,308,952 B1 * 10/2001 Takagi .................... B65H 31/22
271/297
(Continued)

FOREIGN PATENT DOCUMENTS

CN 1949096 A 4/2007
CN 102862834 A 1/2013
(Continued)

*Primary Examiner* — Prasad V Gokhale
(74) *Attorney, Agent, or Firm* — Canon U.S.A., Inc. I.P. Division

(57) ABSTRACT

A mount apparatus to be mounted on a top surface, in a vertical direction, of a main body of an image forming apparatus configured to form an image on a sheet, includes a latch member extending toward the main body from a surface facing the top surface of the main body and being rotatable around a rotational axis extending in a direction along a direction orthogonal to the vertical direction, and a biasing member configured to bias the latch member in a predetermined rotation direction. The latch member is inserted into the main body through an opening that is provided on the top surface of the main body and is engaged with the main body by a biasing force of the biasing member in a state where the mount apparatus is mounted on the main body.

12 Claims, 8 Drawing Sheets

(51) Int. Cl.
*B65H 31/32* (2006.01)
*G03G 21/16* (2006.01)
*B41J 29/08* (2006.01)
*B41J 29/13* (2006.01)
*B41J 13/10* (2006.01)
*B65H 31/02* (2006.01)
*B65H 31/24* (2006.01)
*B65H 1/00* (2006.01)
*B41J 29/12* (2006.01)
*H04N 1/00* (2006.01)
*B41J 29/06* (2006.01)
*G03G 15/00* (2006.01)

(52) U.S. Cl.
CPC ............... *B65H 1/00* (2013.01); *B65H 31/02* (2013.01); *B65H 31/24* (2013.01); *B65H 31/32* (2013.01); *B65H 39/06* (2013.01); *G03G 21/1619* (2013.01); *B41J 29/06* (2013.01); *B41J 29/12* (2013.01); *B65H 2402/10* (2013.01); *B65H 2408/111* (2013.01); *B65H 2408/1164* (2013.01); *B65H 2801/27* (2013.01); *G03G 15/6552* (2013.01); *G03G 2221/1696* (2013.01); *H04N 1/00633* (2013.01)

(58) Field of Classification Search
CPC ................ B65H 2402/10; B65H 39/06; G03G 21/1619; G03G 2221/1696; G03G 15/6552; B41J 29/06; B41J 29/12; H04N 1/00633
See application file for complete search history.

(56) References Cited

U.S. PATENT DOCUMENTS

| | | | | |
|---|---|---|---|---|
| 6,331,003 | B1 * | 12/2001 | Yokota | B65H 29/60 271/287 |
| 10,329,113 | B2 * | 6/2019 | Tsuji | G03G 21/1619 |
| 2015/0102556 | A1 * | 4/2015 | Tsuji | B65H 31/3081 271/279 |
| 2016/0288537 | A1 | 10/2016 | Hirose | |

FOREIGN PATENT DOCUMENTS

| | | | |
|---|---|---|---|
| CN | 103818762 A | | 5/2014 |
| JP | H11-236166 A | | 8/1999 |
| JP | 2002-217561 A | | 8/2002 |
| JP | 2002-258562 A | | 9/2002 |
| JP | 2003076090 | * | 3/2003 |
| JP | 2003076090 A | * | 3/2003 |
| JP | 2004-041676 A | | 2/2004 |
| JP | 2004048232 | * | 2/2004 |
| JP | 2004048232 A | * | 2/2004 |
| JP | 2005321683 | * | 11/2005 |
| JP | 2005321683 A | * | 11/2005 |
| JP | 2007-145584 A | | 6/2007 |

* cited by examiner

MOUNT APPARATUS TO BE MOUNTED ON MAIN BODY OF IMAGE FORMING APPARATUS, AND IMAGE FORMING APPARATUS INCLUDING MOUNT APPARATUS

CROSS REFERENCE TO RELATED APPLICATIONS

This application is a continuation of U.S. patent application Ser. No. 15/838,959, filed on Dec. 12, 2017, which claims priority from Japanese Patent Application No. 2016-256754, filed Dec. 28, 2016, all of which are hereby incorporated by reference herein in their entirety.

BACKGROUND OF THE INVENTION

Field of the Invention

The present invention relates to a mount apparatus to be mounted on a top surface, in a vertical direction, of a main body of an image forming apparatus that forms an image on a sheet, and to an image forming apparatus including the mount apparatus.

Description of the Related Art

An image forming apparatus, on a top surface of a main body of which in a vertical direction an optional apparatus is mountable, is well known. Examples of the optional apparatus include a sheet stacking apparatus and a sheet post-processing apparatus that performs post-processing such as binding processing. For example, in an apparatus discussed in Japanese Patent Application Laid-Open No. 2003-76090, a positioning member is provided on a bottom surface of the sheet post-processing apparatus, and the positioning member is inserted into a hole of the a main body of the image forming apparatus so that the sheet post-processing apparatus is positioned with respect to the main body.

In the apparatus configuration discussed in Japanese Patent Application Laid-Open No. 2003-76090, a fitting length of the positioning member provided in the sheet post-processing apparatus with the positioning member receiving hole provided in the main body is made sufficiently large, which stabilizes a posture of the sheet post-processing apparatus even if an external force is applied to the sheet post-processing apparatus. Along with downsizing of the image forming apparatus, however, the space for a sufficiently large fitting length may not be secured in some cases, unlike the apparatus discussed in Japanese Patent Application Laid-Open No. 2003-76090. As a result, there is an issue that the sheet post-processing apparatus is easily inclined with respect to the image forming apparatus in a case where the external force is applied to the sheet post-processing apparatus.

SUMMARY OF THE INVENTION

According to an aspect of the present invention, a mount apparatus to be mounted on a top surface, in a vertical direction, of a main body of an image forming apparatus configured to form an image on a sheet, includes a latch member and a biasing member. The latch member extends toward the main body from a surface facing the top surface of the main body, is rotatable around a rotational axis extending in a direction along a direction orthogonal to the vertical direction, and includes a first protrusion and a second protrusion. The first protrusion protrudes in a direction intersecting the direction in which the latch member extends, and the second protrusion is provided on a distal end side of the latch member relative to the first protrusion and protrudes in a direction opposite to the direction in which the first protrusion protrudes. The biasing member is configured to bias the latch member in a predetermined rotation direction. The first protrusion is inserted into the main body through an opening provided on the top surface of the main body and is engaged with the main body by a biasing force of the biasing member in a state where the mount apparatus is mounted on the main body. In a case where the mount apparatus is inclined with respect to the main body in a direction in which engagement of the first protrusion with the main body is released, the second protrusion is engaged with the main body so as to regulate inclination of the mount apparatus.

According to another aspect of the present invention, an image forming apparatus includes a main body of an image forming apparatus configured to form an image on a sheet, and a mount apparatus mounted on a top surface of the main body in a vertical direction. The mount apparatus includes a latch member and a biasing member. The latch member extends toward the main body from a surface facing the top surface of the main body. The latch member is rotatable around a rotational axis extending in a direction along a direction orthogonal to the vertical direction. The latch member includes a first protrusion and a second protrusion. The first protrusion protrudes in a direction intersecting the direction in which the latch member extends, and the second protrusion is provided on a distal end side of the latch member relative to the first protrusion and protrudes in a direction opposite to the direction in which the first protrusion protrudes. The biasing member biases the latch member in a predetermined rotation direction. The first protrusion is inserted into the main body through an opening provided on the top surface of the main body and is engaged with the main body by a biasing force of the biasing member in a state where the mount apparatus is mounted on the main body. In a direction in which engagement of the first protrusion with the main body is released, the second protrusion is engaged with the main body so as to regulate inclination of the mount apparatus.

According to yet another aspect of the present invention, a mount apparatus to be mounted on a top surface, in a vertical direction, of a main body of an image forming apparatus configured to form an image on a sheet, includes a latch member that extends toward the main body from a surface facing the top surface of the main body and is rotatable around a rotational axis extending in a direction orthogonal to the vertical direction, and a biasing member configured to bias the latch member in a predetermined rotation direction. The latch member is inserted into the main body through an opening that is provided on the top surface of the main body and is engaged with the main body by a biasing force of the biasing member in a state where the mount apparatus is mounted on the main body.

Further features of the present invention will become apparent from the following description of exemplary embodiments with reference to the attached drawings.

DESCRIPTION OF THE EMBODIMENTS

Figure 1:
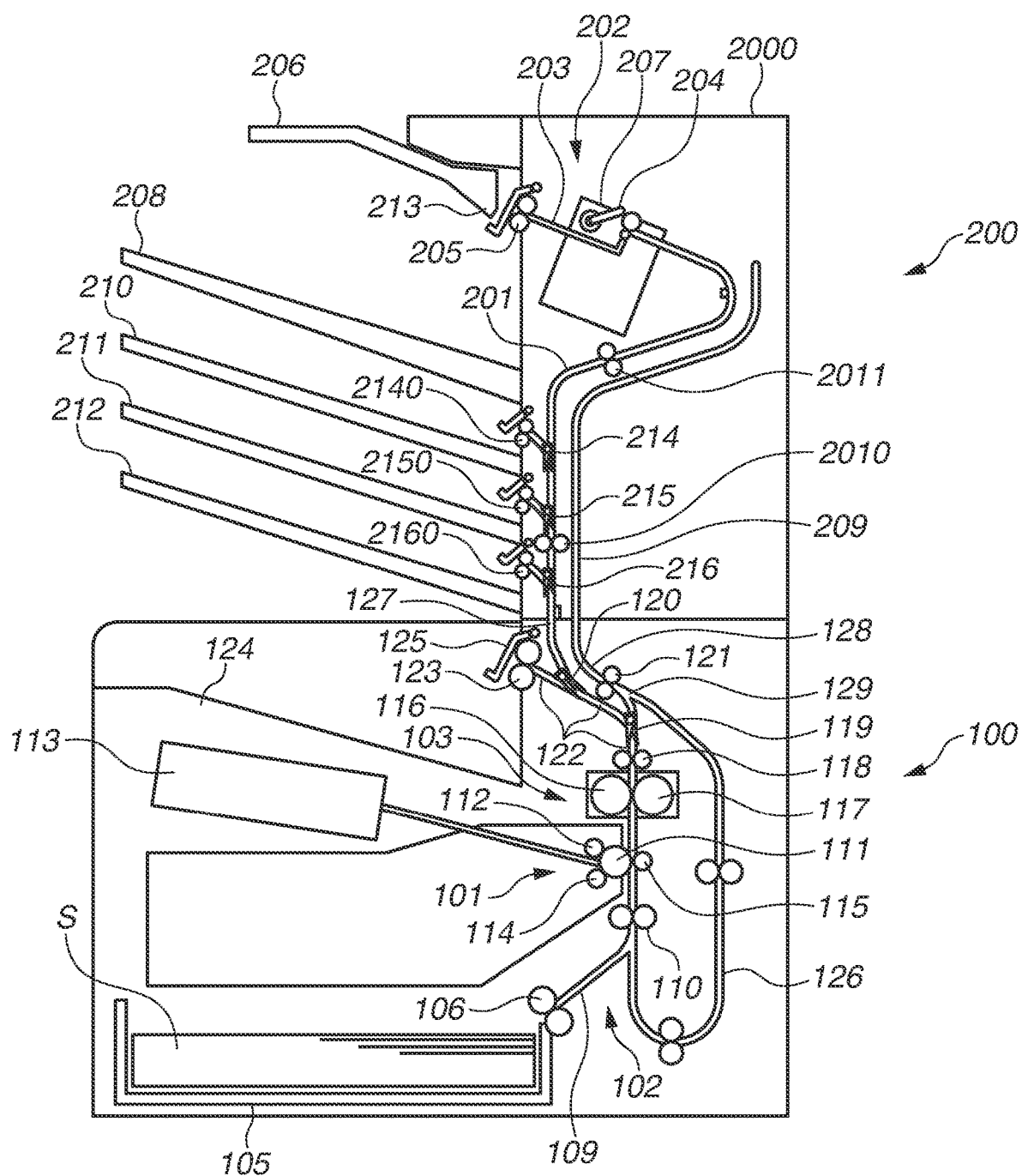
FIG. 1 is a schematic cross-sectional view of an image forming apparatus and a sheet post-processing apparatus.
Figure 2A:
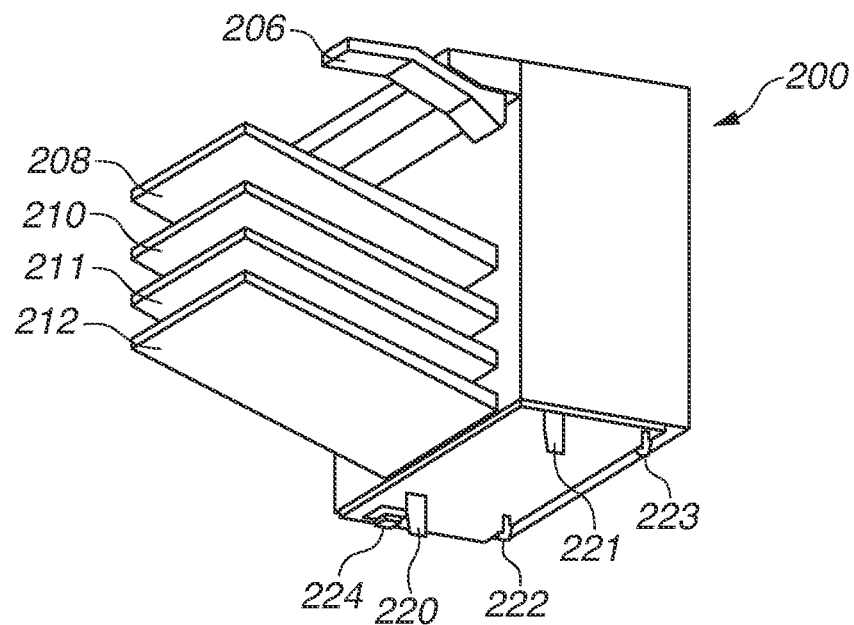
FIGS. 2A and 2B are a perspective view of the image forming apparatus and a perspective view of the sheet post-processing apparatus according to a first exemplary embodiment.
Figure 2B:
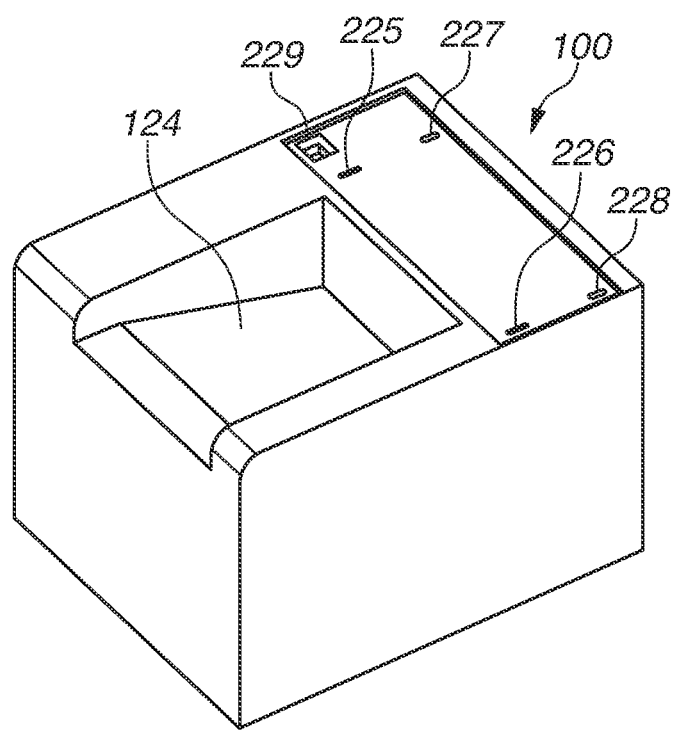

Some preferred embodiments of the present invention are described with reference to drawings. FIG. 1 is a schematic cross-sectional view of a printer that is an example of an image forming apparatus to which the exemplary embodiment of the present invention is applied. FIG. 1 illustrates a main body of an image forming apparatus 100 (hereinafter, referred to as apparatus main body). A sheet post-processing apparatus (sheet stacking apparatus) 200 serving as an optional apparatus (mount apparatus) is mounted on a top surface of the apparatus main body 100 in a vertical direction. FIG. 2A is a perspective view of the sheet post-processing apparatus 200, and FIG. 2B is a perspective view of the apparatus main body 100.

The apparatus main body 100 includes an image forming unit 101. A sheet feeding unit 102 feeds a sheet to the image forming unit 101, and a fixing unit 103 fixes an image on the sheet.

The image forming unit 101 includes a photosensitive drum 111, an exposure device 113, a charging roller 112, a development device 114, and a transferring roller 115. The photosensitive drum 111 rotates in a clockwise direction in FIG. 1. The charging roller 112, the transferring roller 115, and the development device 114 are disposed substantially in this order along the rotation direction of the photosensitive drum 111. The image forming unit 101 forms a toner image on a sheet S through image forming processing.

The sheet feeding unit 102 includes a sheet feeding cassette 105, a sheet feeding roller 106, a conveyance guide 109, and a registration roller 110. In the sheet feeding cassette 105, a plurality of sheets on which an image is to be formed is stacked. The fixing unit 103 includes a fixing roller 116, a pressurizing roller 117, and a conveying roller 118. The pressurizing roller 117 is in contact with the fixing roller 116. A first sheet conveyance path 122 guides and conveys the sheet that has passed through the conveying roller 118.

A first switching member 119 and a second switching member 120 are provided on the first sheet conveyance path 122. A sheet discharge roller 123 discharges and stacks the sheet to a first stacking unit 124. A full-stacking detection lever 125 detects full stacking of sheets stacked on the first stacking unit 124. A second sheet conveyance path 127 is branched from the first sheet conveyance path 122, and guides a sheet to the sheet post-processing apparatus 200. A third sheet conveyance path 128 guides a sheet in double-sided printing. The third sheet conveyance path 128 includes a branching portion 129, and a reversing roller 121 is provided on the downstream of the branching portion 129.

The first switching member 119 is switched between conveying the sheet to the downstream of the first sheet conveyance path 122 and guiding the sheet to the third sheet conveyance path 128. The second switching member 120 is switched between guiding the sheet to the second sheet conveyance path 127 and guiding the sheet to the stacking unit 124.

After the sheet is guided by the third sheet conveyance path 128 and a trailing end of the sheet passes through the branching portion 129, the rotation direction of the reversing roller 121 is reversed to guide the sheet to a sheet re-feeding conveyance path 126. The sheet re-feeding conveyance path 126 is joined to the conveyance guide 109 on the upstream of the registration roller 110, and the sheet is conveyed to the image forming unit 101 again.

A configuration of the sheet post-processing apparatus 200 that is mounted on the top surface of the apparatus main body 100 in the vertical direction is to be described. The sheet post-processing apparatus 200 includes a fourth sheet conveyance path 201 and a sheet conveyance unit 2010. The fourth sheet conveyance path 201 receives the sheet that has been guided and conveyed by the second sheet conveyance path 127 in the apparatus main body 100. The fourth sheet conveyance path 201 includes branching portions at which three conveyance paths are branched from the fourth sheet conveyance path 201. The three conveyance paths include discharging units 2140, 2150, and 2160, respectively, to discharge the sheet to the outside of the sheet post-processing apparatus 200. Switching members 214, 215, and 216 to switch the conveyance direction of the sheet are provided at the respective branching portions. The sheet post-processing apparatus 200 further includes sheet stacking units 210, 211, and 212 on which the sheets discharged by the discharging units 2140, 2150, and 2160, respectively, are stacked. The sheet stacking units (plurality of stacking units) 210 to 212 are trays provided on one of surfaces of a sheet post-processing apparatus 200. The sheet post-processing apparatus 200 includes sheet conveyance units 2010 and 2011, the fourth sheet conveyance path 201, and the discharging units 2140 to 2160. A sheet post-processing unit 202 and the sheet conveyance unit 2011 that conveys the sheet toward the sheet post-processing unit 202 are provided on the downstream of the three branching portions of the fourth sheet conveyance path 201 in the sheet conveyance direction. A stacking unit 208, with a sheet on which the post-processing has been performed by the sheet post-processing unit 202 being stacked thereon, is provided on the downstream of the sheet post-processing unit 202 in the sheet conveyance direction.

The sheet post-processing unit 202 includes an intermediate stacking unit 203, a first alignment section 204, paired conveying rollers 205, a second alignment section 206, and a post-processing section 207. The first alignment section 204 aligns the sheet in the conveyance direction. The paired conveying rollers 205 are contactable to and separable from the sheet. The second alignment section 206 aligns the sheet in a width direction.

A fifth sheet conveyance path 209 guides and receives the sheet that has been guided and conveyed by the third sheet conveyance path 128 in the apparatus main body 100. Next, an operation of the apparatus main body 100 and the sheet post-processing apparatus 200 is described.

A case where a sheet is discharged to and stacked on the first stacking unit 124 is to be described. A sheet on which the image has been fixed by the fixing unit 103 is conveyed by the conveying roller 118 to the downstream. The first switching member 119 is switched to a right position out of two positions illustrated in FIG. 1 and held by an actuator (not shown). Further, the second switching member 120 is switched to an upper position out of two positions illustrated in FIG. 1 and held by the actuator (not shown). The sheet is discharged by the sheet discharge roller 123 and stacked on the first stacking unit 124. When a predetermined number of sheets or more is stacked on the first stacking unit 124 and the full stacking of the sheets is detected by the full-stacking detection lever 125, a control unit (not shown) performs control so as not to convey the sheet to the first stacking unit 124 until the sheets on the first stacking unit 124 are removed.

A case where the sheet is discharged to and stacked on the second stacking unit 208 is to be described. The first switching member 119 is held at the right position out of the two positions illustrated in FIG. 1, and the second switching member 120 is held at a lower position out of the two positions illustrated in FIG. 1. The sheet conveyed by the conveying roller 118 to the downstream is conveyed to the sheet post-processing unit 202 through the second sheet conveyance path 127 and the fourth sheet conveyance path 201. In a case where the post-processing is not performed on the sheet, the paired conveying rollers 205 are located at a contacted position, and the sheet is discharged to and stacked on the second stacking unit 208. When a predetermined number of sheets or more is stacked on the second stacking unit 208 and the full stacking of the sheets is detected by a full-stacking detection lever 213, a control unit (not shown) performs control so as not to convey the sheet to the second stacking unit 208 until the sheets on the second stacking unit 208 are removed. In a case where the post-processing is performed on the sheet by the post-processing section 207, the paired conveying rollers 205 are separated from each other, and the sheet is stacked on the intermediate stacking unit 203. Thereafter, the second alignment section 206 aligns the sheet in the width direction, and further, the first alignment section 204 comes into contact with an upper surface of the stacked sheet, thereby aligning the sheet in the conveyance direction. When the alignment processing is performed on each page and the alignment processing on a predetermined number of sheets is completed, the post-processing section 207 performs binding processing on a bundle of the sheets. After the binding processing is completed, the paired conveying rollers 205 that have been separated from each other are moved to the contacted position and rotated, which causes the sheet bundle to be discharged to and stacked on the second stacking unit 208 from the intermediate stacking unit 203. In a case where the sheet is discharged to and stacked on any of the stacking units 210, 211, and 212, the switching members 214, 215, and 216 are switched by the actuator (now shown), and the sheet is accordingly conveyed to a desired stacking unit.

An operation in a case where printing is performed on both surfaces of the sheet is to be described. The first switching member 119 is held at a left position out of the two positions illustrated in FIG. 1, and the sheet is guided to the fifth sheet conveyance path 209 in the sheet post-processing apparatus 200 through the reversing roller 121 and the third sheet conveyance path 128. When the trailing end of the sheet passes through the branching portion 129, the rotation direction of the reversing roller 121 is reversed, and the sheet is guided to the sheet re-feeding conveyance path 126. Thereafter, the sheet passes through the image forming unit 101 and the fixing unit 103, thereby double-sided printing is performed on the sheet. Thereafter, the switching members are switched so that the sheet is discharged to a desired stacking unit.

A latch member provided in the sheet post-processing apparatus 200 that is a feature of the first exemplary embodiment is to be described.

FIG. 2A is a perspective view of the sheet post-processing apparatus 200 as viewed from a bottom surface side. FIG. 2B is a perspective view of the apparatus main body 100 as viewed from a top surface side. Positioning members 220 and 221, latch members 222 and 223, and a first connector 224 are provided on the bottom surface of the sheet post-processing apparatus 200 in the vertical direction. On the other hand, positioning member receiving holes (positioning) 225 and 226, latch member receiving portions 227 and 228, and a second connector 229 are provided on the top surface of the apparatus main body 100 in the vertical direction.

The latch members 222 and 223 and the positioning members 220 and 221 extend toward the apparatus main body 100 from the bottom surface of the sheet post-processing apparatus 200 in the vertical direction that faces the top surface of the apparatus main body 100 in the vertical direction.

The positioning member 220 is inserted into the positioning member receiving hole 225, and the positioning member 221 is inserted into the positioning member receiving hole 226. Root portions of the positioning members 220 and 221 are fitted in the positioning member receiving holes 225 and 226, respectively. As a result, the sheet post-processing apparatus 200 is positioned relative to the apparatus main body 100 in front-rear and right-left directions. Further, the latch member 222 is engaged with the latch member receiving portion 227, and the latch member 223 is engaged with the latch member receiving portion 228. Details of the configurations and operations of the latch members and the latch member receiving portions are described below.

When the first connector 224 is connected to the second connector 229, power is supplied to the sheet post-processing apparatus 200 through the connectors, and communication between the control unit (not shown) of the sheet post-processing apparatus 200 and the control unit (not shown) of the apparatus main body 100 is performed through the connectors.

Figure 3A:
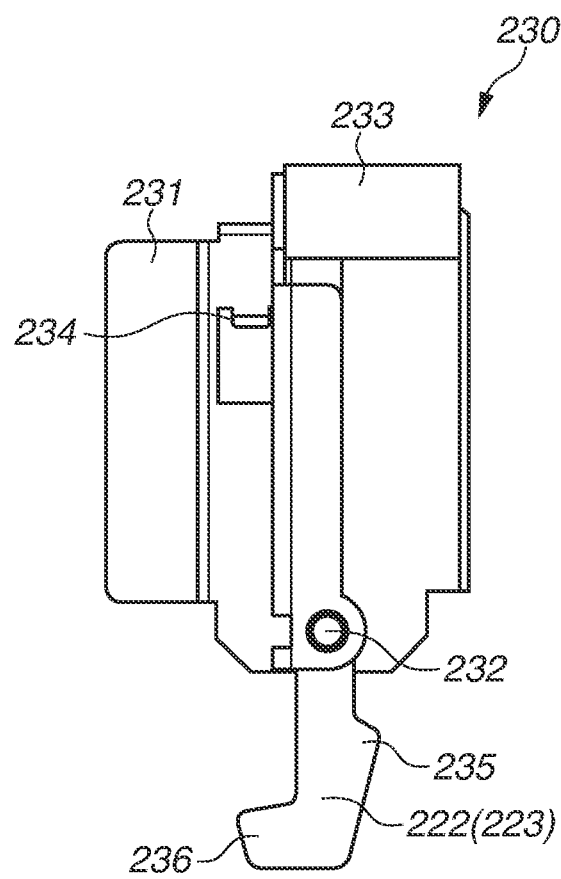
FIGS. 3A and 3B are explanatory diagrams of an operation of a latch member according to the first exemplary embodiment.
Figure 3B:
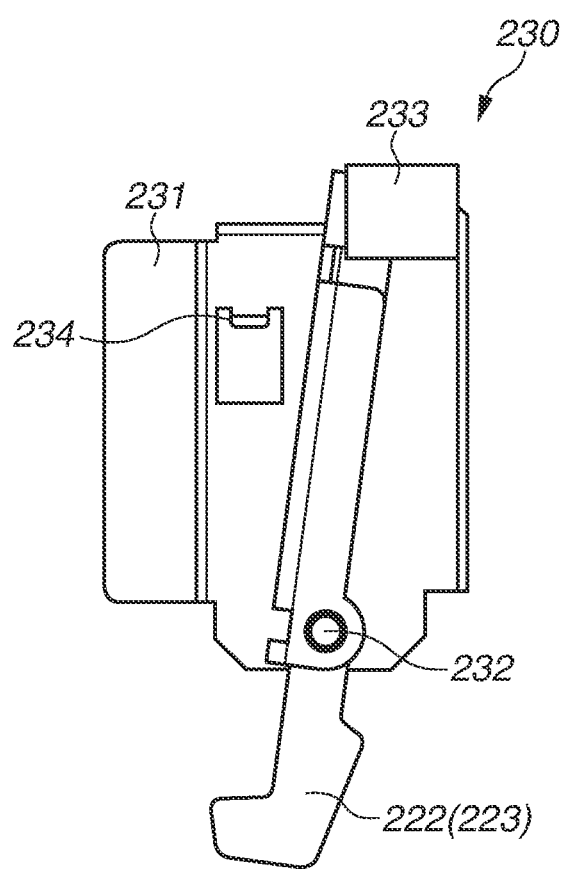

FIGS. 3A and 3B are diagrams of a latch unit 230 that includes the latch member 222 (also 223) as viewed from the direction same as the direction in FIG. 1. The latch unit 230 includes a base plate 231, a rotary shaft 232, and an elastic member (compression spring) 233 serving as a biasing member. The rotary shaft 232 is fixed to the base plate 231, and the latch member 222 is rotatable around the rotary shaft 232 that extends in a direction orthogonal to the vertical direction. The latch member 222 is biased by the elastic member 233 so as to be rotated in a counterclockwise direction in FIGS. 3A and 3B, and the latch member 222 is brought into contact with a mechanical stopper 234 provided on the base plate 231 so that a posture of the latch member 222 is determined. FIG. 3A is a diagram illustrating a state where the latch member 222 is positioned at a home position. FIG. 3B is a diagram illustrating a state where the latch member 222 is rotated by receiving an external force for rotating the latch member 222 in the clockwise direction. The latch member 222 includes a first protrusion 235 and a second protrusion 236. The base plate 231 is fixed to a housing of the sheet post-processing apparatus 200. The first protrusion 235 protrudes in a direction intersecting the direction in which the latch member 222 extends. The second protrusion 236 is provided on a distal end side of the latch member 222 relative to the first protrusion 235 and protrudes in a direction opposite to the direction in which the first protrusion 235 protrudes.

Figure 4A:
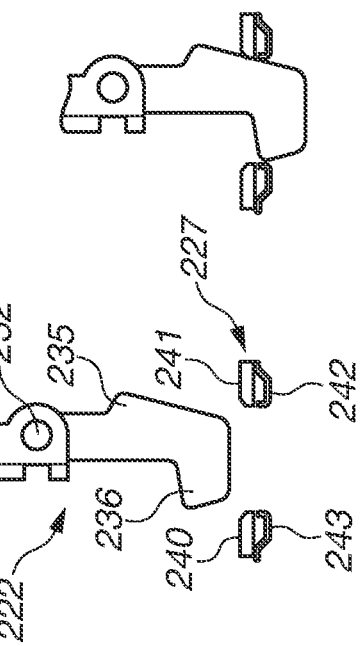
FIGS. 4A to 4E are explanatory diagrams of the operation of the latch member according to the first exemplary embodiment.
Figure 4B:
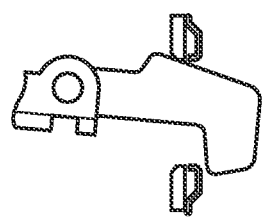
Figure 4C:
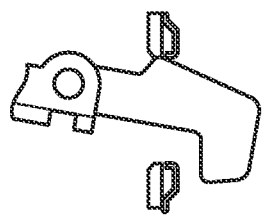
Figure 4D:
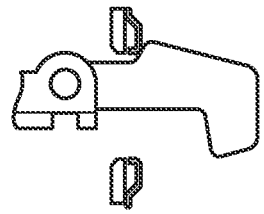
Figure 4E:
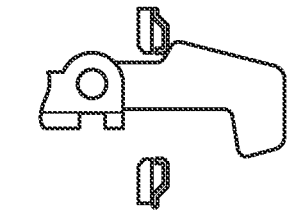

FIGS. 4A to 4E are diagrams illustrating a configuration and an operation of the latch member 222 and peripheral members thereof when the sheet post-processing apparatus 200 is moved downward in the substantially vertical direction and is mounted on the apparatus main body 100. The latch member receiving portion 227 (228) as an opening includes exterior covers 240 and 241, a first receiving portion 242, and a second receiving portion 243. FIG. 4A illustrates a state before the latch member 222 and the latch member receiving portion 227 come into contact with each other. FIG. 4B illustrates a state where the sheet post-processing apparatus 200 is slightly moved in the vertical downward direction from the position illustrated in FIG. 4A, and the first protrusion 235 and the exterior cover 241 are in contact with each other. At this time, there is a gap between the second protrusion 236 and both of the exterior cover 240 and the second receiving portion 243. Before the state illustrated in FIG. 4B, the positioning members 220 and 221 are fitted in the positioning member receiving holes 225 and 226, respectively, and positioning is accordingly performed. FIG. 4C illustrates a state where an inclined surface of the first protrusion 235 is in contact with the exterior cover 241 and the first receiving portion 242, and the latch member 222 is slightly rotated in the clockwise direction in FIG. 4C around the rotary shaft 232. FIG. 4D illustrates a state where the sheet post-processing apparatus 200 is further moved in the vertical downward direction, and the latch member 222 is rotated in the clockwise direction. FIG. 4E illustrates a state where the sheet post-processing apparatus 200 is completely mounted on the apparatus main body 100. The first protrusion 235 is biased toward the first receiving portion 242 by an elastic force of the elastic member 233. In other words, the first protrusion 235 of the latch member 222 is engaged with the first receiving portion (engaged portion) 242 of the apparatus main body 100 by the elastic force of the elastic member 233. As illustrated in FIG. 4B to FIG. 4E, the second protrusion 236 is not in contact with the exterior cover 240 or the second receiving portion 243 when the sheet post-processing apparatus 200 is mounted.

In contrast, when the sheet post-processing apparatus 200 is demounted from the apparatus main body 100, the sheet post-processing apparatus 200 is lifted up in the substantially vertical direction to cause the latch member 222 to operate in order of FIG. 4E to FIG. 4A.

Figure 5A:
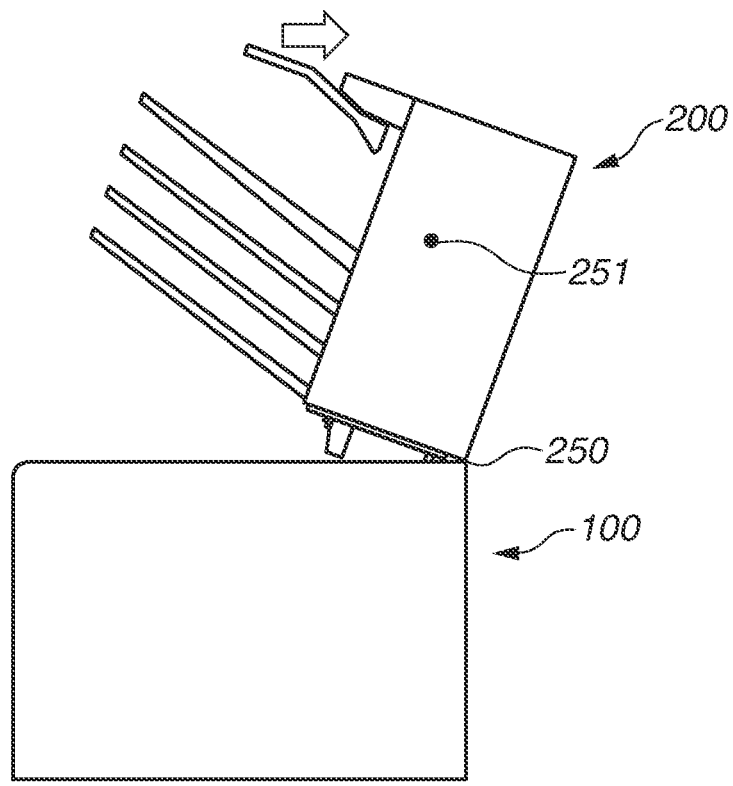
FIGS. 5A and 5B are state diagrams when an external force is applied from a stacking unit to the sheet post-processing apparatus.
Figure 5B:
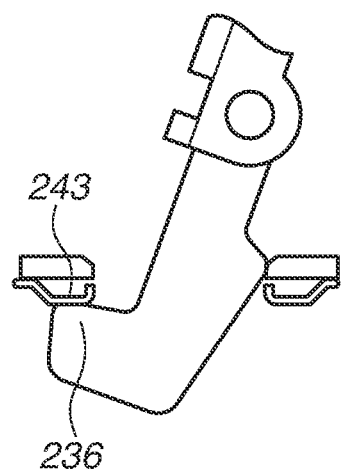

FIG. 5A illustrates a state of the sheet post-processing apparatus 200 when an external force in an arrow direction is applied to the sheet post-processing apparatus 200 from a side provided with the stacking units 208 and 210 to 212. The sheet post-processing apparatus 200 is rotated around a lower right end portion (250) of the apparatus illustrated in FIG. 5A and is inclined while the sheet stacking portion side is raised. In other words, FIG. 5A illustrates a state of the latch member 222 and the peripheral members thereof in a case where the sheet post-processing apparatus 200 is inclined, with respect to the apparatus main body 100, in a direction in which engagement of the first protrusion 235 with the first receiving portion 242 is released. The second protrusion 236 gets under the second receiving portion (contact portion) 243 and comes into contact with the second receiving portion 243 due to the inclination of the sheet post-processing apparatus 200. In other words, the second protrusion 236 is locked by the second receiving portion 243 when the sheet post-processing apparatus 200 is inclined with respect to the apparatus main body 100 in the above-described direction. Accordingly, the inclination of the sheet post-processing apparatus 200 with respect to the apparatus main body 100 is regulated in such a manner that the sheet post-processing apparatus 200 is not inclined by an angle exceeding an angle illustrated in FIG. 5A (predetermined angle) even by the external force. In FIG. 5A, a position of a centroid 251 of the sheet post-processing apparatus 200 is illustrated. Shapes of related components are determined in such a manner that the sheet post-processing apparatus 200 is not as inclined as the centroid 251 is positioned beyond the rotation center 250 even if the sheet post-processing apparatus 200 is inclined.

The configuration of the first exemplary embodiment described above achieves the following effects. As illustrated in FIG. 1, the stacking units 208 and 210 to 212 of the sheets are provided on a side opposite to the direction in which the first protrusion 235 of the latch member 222 protrudes with respect to the sheet post-processing apparatus main body (sheet stacking apparatus main body) 2000. Therefore, even in a case where a large number of sheets is stacked on any of the stacking units 208 and 210 to 212, the sheet post-processing apparatus 200 is hardly inclined because the first protrusion 235 of the latch member 222 is engaged with the first receiving portion 242.

Further, even if an external force is applied to the sheet post-processing apparatus 200 from the side provided with the stacking unit 208, the sheet post-processing apparatus 200 is not rotated by the predetermined angle or more by contact between the second protrusion 236 of the latch member 222 and the second receiving portion 243, which stabilizes the posture of the sheet post-processing apparatus 200. Even in a case where the sheet post-processing apparatus 200 is inclined by the predetermined angle, the sheet post-processing apparatus 200 is not as inclined as the centroid 251 of the sheet post-processing apparatus 200, with no sheet being stacked on any of the stacking units 208 and 210 to 212, is positioned beyond the rotation center 250. Accordingly, when the external force applied to the sheet post-processing apparatus 200 is removed, the sheet post-processing apparatus 200 returns to the original position by its own weight. The external force described here is a force applied by a user. For example, the external force is applied in a case where the user unintentionally puts a hand on the sheet post-processing apparatus 200 to move the image forming apparatus. In the normal printing operation, such an external force is not applied to the sheet post-processing apparatus 200, and the side provided with the stacking unit 208 is not raised. A plurality of latch units 230 is provided on the apparatus in the width direction (vertical direction on a paper surface in FIG. 1 or FIG. 5A), and the latch units 230 are disposed near the end portions of the apparatus in the width direction. This prevents the sheet post-processing apparatus 200 from being raised from the apparatus main body 100 also when the external force is applied to the sheet post-processing apparatus 200 from the width direction. In other words, even in the configuration in which the fitting length of the positioning member of the sheet post-processing apparatus with the apparatus main body is not sufficiently long, the posture of the sheet post-processing apparatus with respect to the main body is stabilized. The configuration in the first exemplary embodiment makes it possible to contribute to downsizing and cost reduction of the apparatus.

It is possible to mount and demount the sheet post-processing apparatus 200 on/from the apparatus main body 100 without causing a user to perform an operation such as release of the latch members. Further, the length relationship is set in such a way that the positioning members are fitted in the apparatus main body 100 before the connector and the latch members are fitted in the apparatus main body 100. As a result, high workability can be achieved when the sheet post-processing apparatus 200 is mounted on the apparatus main body 100.

In the first exemplary embodiment, the sheet post-processing apparatus is described as the optional apparatus that is to be mounted on the top surface of the apparatus main body 100 in the vertical direction. However, the optional apparatus is not limited thereto. For example, similar effects are achievable by other optional apparatuses such as a reading scanner, and an auto document feeder (ADF).

A configuration described in a second exemplary embodiment is the same as the configuration in the first exemplary embodiment except for a latch unit 300. Therefore, description of the configuration other than the latch unit 300 is omitted.

The latch unit 300 according to the second exemplary embodiment is to be described with reference to FIGS. 6A to 6D.

The latch unit 300 includes a base plate 301, a rotary shaft 302, an elastic member (torsion coil spring) 303, and a latch member 304. The base plate 301 is fixed to the housing of the sheet post-processing apparatus 200. The rotary shaft 302 is fixed to the base plate 301, and the latch member 304 is rotatable around the rotary shaft 302. In the elastic member 303, the rotary shaft 302 penetrates through a coil portion, one end of an arm is hooked on the base plate 301, and the other end is hooked on the latch member 304. The latch member 304 is biased so as to be rotated in the clockwise direction in FIG. 6A. The latch member 304 is brought into contact with a mechanical stopper 305 provided on the base plate 301, and a posture of the latch member 304 is accordingly determined. The latch member 304 includes a first protrusion 306, and the base plate 301 includes a second protrusion 307. The first protrusion 306 protrudes in a direction intersecting a direction in which the latch member 304 extends. The second protrusion 307 is provided on a distal end side of the latch unit 300 relative to the first protrusion 306, and protrudes in a direction opposite to the direction in which the first protrusion 306 protrudes.

Figure 6D:
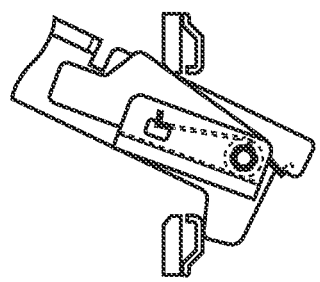
FIGS. 6A to 6D are explanatory diagrams of an operation of a latch member according to a second exemplary embodiment.
Figure 6C:
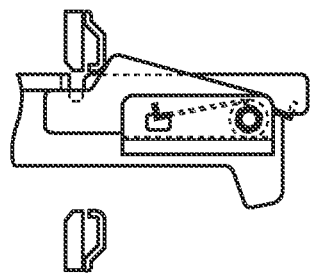
Figure 6B:
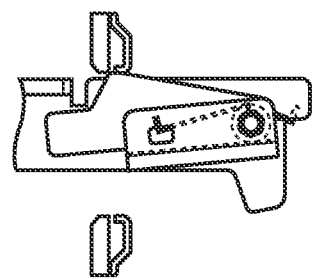
Figure 6A:
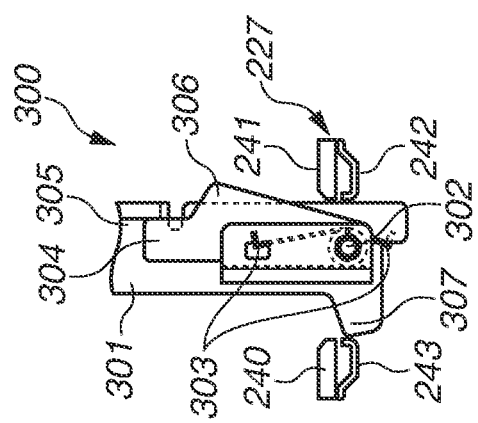

FIG. 6A is a diagram illustrating a state where the latch member 304 is positioned at a home position. FIG. 6A illustrates a state before the latch member 304 and the latch member receiving portion 227 come into contact with each other. Before the state illustrated in FIG. 6A, the positioning members 220 and 221 are fitted in the positioning member receiving holes 225 and 226, respectively, and positioning is accordingly performed. FIG. 6B illustrates a state where the sheet post-processing apparatus 200 is slightly moved downward from the position illustrated in FIG. 6A, the first protrusion 306 and the exterior cover 241 are in contact with each other, and the latch member 304 is rotated in the counterclockwise direction in FIG. 6B around the rotary shaft 302. FIG. 6C illustrates a state where the sheet post-processing apparatus 200 is completely mounted on the apparatus main body 100. The first protrusion 306 is biased toward the first receiving portion 242 by an elastic force of the elastic member 303. In other words, the first protrusion 306 of the latch member 304 is engaged with the first receiving portion (engaged portion) 242 of the apparatus main body 100 by the elastic force of the elastic member 303. As illustrated in FIG. 6A to FIG. 6C, the second protrusion 307 is not in contact with the exterior cover 240 or the second receiving portion 243 when the sheet post-processing apparatus 200 is mounted.

In contrast, when the sheet post-processing apparatus 200 is demounted from the apparatus main body 100, the sheet post-processing apparatus 200 is lifted up in the substantially vertical direction to cause the latch member 304 to operate in order of FIG. 6C to FIG. 6A.

FIG. 6D illustrates the latch unit 300 and peripheral members thereof in a state where the sheet post-processing apparatus 200 is inclined with respect to the apparatus main body 100 in a direction in which engagement of the first protrusion 306 with the first receiving portion 242 is released. The second protrusion 307 is in contact with the second receiving portion 243 due to inclination of the sheet post-processing apparatus 200.

In contrast, the latch member 304 is in contact with the exterior cover 241 by the biasing force of the elastic member 303. Therefore, the inclination of the sheet post-processing apparatus 200 is regulated in such a way that the sheet post-processing apparatus 200 is not as inclined as to exceed the posture (predetermined angle) illustrated in FIG. 6D by the external force. The configuration, in which the sheet post-processing apparatus 200 is not as inclined as the centroid 251 is positioned beyond the rotation center 250, is also similar to the configuration of the first exemplary embodiment.

According to the above-described configuration, the apparatus can be provided in which the posture of the sheet post-processing apparatus with respect to the main body is stabilized even if the fitting length of the positioning member of the sheet post-processing apparatus with the apparatus main body is not long. The configuration of the second exemplary embodiment is effective in a case where there is no space for installation of constituent components of the latch unit 300 inside the sheet post-processing apparatus 200 but there is a space for installation of the constituent components of the latch unit 300 inside the apparatus main body 100.

The configuration described in a third exemplary embodiment is the same as the configuration of the first exemplary embodiment except for a latch unit 400. Therefore, description of the configuration other than the latch unit 400 is omitted.

Figure 7:
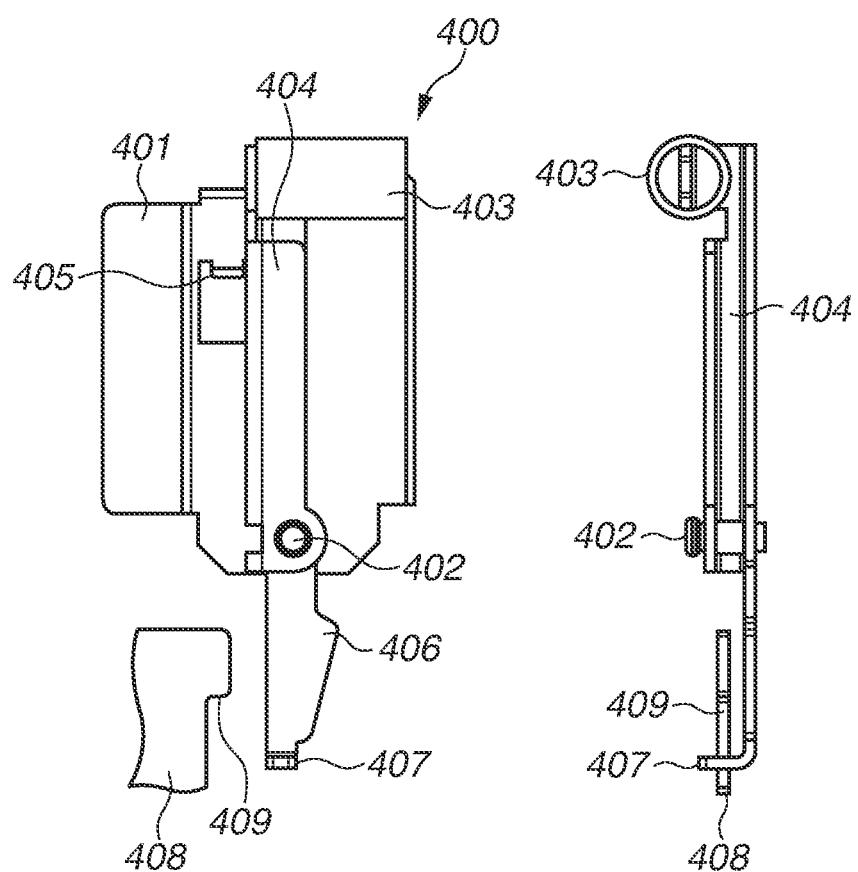
FIG. 7 is an explanatory diagram of a latch member according to a third exemplary embodiment.

A diagram on the left side in FIG. 7 is a front view of the latch unit 400, and a diagram on the right side is a right side view of the latch unit 400.

The latch unit 400 includes a base plate 401, a rotary shaft 402, an elastic member (torsion coil spring) 403, and a latch member 404. The base plate 401 includes a mechanical stopper 405. The base plate 401 is fixed to the housing of the sheet post-processing apparatus 200. The latch member 404 includes a first protrusion 406. The first protrusion 406 protrudes in a direction intersecting a direction in which the latch member 404 extends.

Unlike the first exemplary embodiment, the latch member 404 includes a second protrusion 407 at a distal end of the latch member 404. The second protrusion 407 extends in an axial direction of the rotary shaft 402. Although details are described below, the apparatus main body 100 includes a second receiving member 408 and a second receiving portion 409. As illustrated in the right side view, the second protrusion 407 extends so as to get across the second receiving portion 409.

Figures 8A, 8B, 8C, 8D:
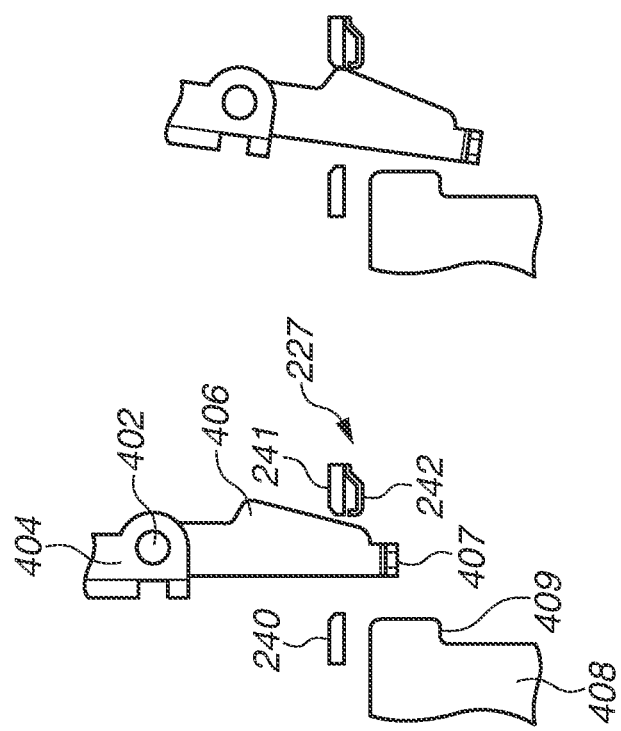
FIGS. 8A to 8D are explanatory diagrams of an operation of the latch member according to the third exemplary embodiment.

FIGS. 8A to 8C illustrate an operation of inserting the latch unit 400 according to the third exemplary embodiment into the apparatus main body 100, in order.

FIG. 8A illustrates a state of the latch unit 400 and peripheral members thereof before the latch member 404 and the latch member receiving portion 227 come into contact with each other. Before the state illustrated in FIG. 8A, the positioning members 220 and 221 illustrated in FIG. 2A are fitted in the positioning member receiving holes 225 and 226, respectively, and positioning is accordingly performed. FIG. 8B illustrates a state where the sheet post-processing apparatus 200 is slightly moved in the vertical downward direction from the position illustrated in FIG. 8A, the first protrusion 406 and the exterior cover 241 are in contact with each other, and the latch member 404 is rotated in the clockwise direction in FIG. 8B around the rotary shaft 402. FIG. 8C illustrates a state of the latch unit 400 and peripheral members thereof when the sheet post-processing apparatus 200 is completely mounted on the apparatus main body 100. The first protrusion 406 is biased toward the first receiving portion 242 by an elastic force of the elastic member 403. As illustrated in FIG. 8A to FIG. 8C, the second protrusion 407 is not in contact with the exterior cover 240 or the second receiving member 408 when the sheet post-processing apparatus 200 is mounted.

In contrast, when the sheet post-processing apparatus 200 is demounted from the apparatus main body 100, the sheet post-processing apparatus 200 is lifted up in the substantially vertical direction to cause the latch member 404 to operate in order of FIG. 8C to FIG. 8A.

FIG. 8D illustrates the latch unit 400 and peripheral members thereof when the apparatus main body 100 and the sheet post-processing apparatus 200 are in the state illustrated in FIG. 5A. The second protrusion 407 is in contact with the second receiving portion 409 due to inclination of the sheet post-processing apparatus 200. On the other hand, the latch member 404 is in contact with the exterior cover 241. Accordingly, inclination of the sheet post-processing apparatus 200 is regulated in such a way that the sheet post-processing apparatus 200 is not as inclined as to exceed the posture (predetermined angle) illustrated in FIG. 8D by the external force. The configuration, in which the sheet post-processing apparatus is not as inclined as the centroid 251 is positioned beyond the rotation center 250 when the sheet post-processing apparatus 200 is inclined, is similar to the configuration of the first exemplary embodiment.

According to the above-described configuration, the apparatus can be provided in which the posture of the sheet post-processing apparatus with respect to the main body is stabilized even if the fitting length of the positioning member of the sheet post-processing apparatus with the apparatus main body is not long.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A mount apparatus to be mounted on a top surface of a main body of an image forming apparatus in a vertical direction, wherein the main body is configured to form an image on a sheet, the mount apparatus comprising:
   a latch member extending in a direction toward the main body from a surface facing the top surface of the main body, wherein the latch member includes a first protrusion and a second protrusion and is rotatable around a rotational axis extending in a direction along a direction orthogonal to the vertical direction;
   a biasing member configured to bias the latch member in a predetermined rotation direction; and
   a positioning member arranged at a position different from a position at which the latch member is arranged and extending toward the main body from the surface facing the top surface of the main body,
   wherein the first protrusion is inserted into the main body through an opening provided on the top surface of the main body and is engaged with the main body by a biasing force of the biasing member in a state where the mount apparatus is mounted on the main body, and
   wherein, in a case where the mount apparatus is inclined with respect to the main body, the second protrusion is engaged with the main body so as to regulate inclination of the mount apparatus, and
   wherein the mount apparatus is positioned with respect to the main body when the positioning member is inserted into the main body through the top surface opening.

2. The mount apparatus according to claim 1,
   wherein the second protrusion is inserted into the main body through the top surface opening, and
   wherein, while the mount apparatus is mounted on the main body and the mount apparatus is not inclined around an end portion with respect to the main body, the second protrusion is not engaged with the main body.

3. The mount apparatus according to claim 1,
   wherein the first protrusion protrudes in a direction intersecting the direction in which the latch member extends, and
   wherein the second protrusion is provided on a distal end side of the latch member relative to the first protrusion and protrudes in a direction opposite to the direction in which the first protrusion protrudes.

4. The mount apparatus according to claim 1,
   wherein the first protrusion protrudes in a direction intersecting the direction in which the latch member extends, and
   wherein the second protrusion is provided on a distal end side of the latch member relative to the first protrusion and protrudes in a direction of a rotational axis of the latch member being rotatable in a predetermined direction.

5. The mount apparatus according to claim 1, further comprising:
   a conveyance unit configured to receive the sheet from the main body and to convey the sheet;
   a discharging unit configured to discharge the sheet conveyed by the conveyance unit to outside of the mount apparatus; and
   a tray on which the sheet discharged from the discharging unit is stacked,
   wherein the first protrusion protrudes in a direction intersecting the direction in which the latch member extends, and
   wherein the tray is configured to extend, with respect to the mount apparatus, in a direction opposite to the direction in which the first protrusion protrudes.

6. The mount apparatus according to claim 5, wherein the tray is one of a plurality of trays, each provided at a position arranged in the vertical direction.

7. An image forming apparatus comprising:
   a main body of an image forming apparatus configured to form an image on a sheet;

a mount apparatus mounted on a top surface of the main body in a vertical direction, wherein the mount apparatus includes:

a latch member extending in a direction toward the main body from a surface facing the top surface of the main body, wherein the latch member includes a first protrusion and a second protrusion and is rotatable around a rotational axis extending in a direction along a direction orthogonal to the vertical direction, a biasing member configured to bias the latch member in a predetermined rotation direction, and a positioning member arranged at a position different from a position at which the latch member is arranged and extending toward the main body from the surface facing the top surface of the main body, wherein the first protrusion is inserted into the main body through an opening provided on the top surface of the main body and is engaged with the main body by a biasing force of the biasing member in a state where the mount apparatus is mounted on the main body, and wherein, in a case where the mount apparatus is inclined with respect to the main body, the second protrusion is engaged with the main body so as to regulate inclination of the mount apparatus, and wherein the mount apparatus is positioned with respect to the main body when the positioning member is inserted into the main body through the top surface opening.

8. The image forming apparatus according to claim 7, wherein the second protrusion is inserted into the main body through the top surface opening, and wherein, while the mount apparatus is mounted on the main body and the mount apparatus is not inclined around an end portion with respect to the main body, the second protrusion is not engaged with the main body.

9. The image forming apparatus according to claim 7, wherein the first protrusion protrudes in a direction intersecting the direction in which the latch member extends, and wherein the second protrusion is provided on a distal end side of the latch member relative to the first protrusion and protrudes in a direction opposite to the direction in which the first protrusion protrudes.

10. The image forming apparatus according to claim 7, wherein the first protrusion protrudes in a direction intersecting the direction in which the latch member extends, and wherein the second protrusion is provided on a distal end side of the latch member relative to the first protrusion and protrudes in a direction of a rotational axis of the latch member being rotatable in a predetermined direction.

11. The image forming apparatus according to claim 7, further comprising:

a conveyance unit configured to receive the sheet from the main body and to convey the sheet;

a discharging unit configured to discharge the sheet conveyed by the conveyance unit to outside of the mount apparatus; and a tray on which the sheet discharged from the discharging unit is stacked, wherein the first protrusion protrudes in a direction intersecting the direction in which the latch member extends, and wherein the tray is configured to extend, with respect to the mount apparatus, in a direction opposite to the direction in which the first protrusion protrudes.

12. The image forming apparatus according to claim 11, wherein the tray is one of a plurality of trays, each provided at a position arranged in the vertical direction.

* * * * *